(12) United States Patent
Joerimann et al.

(10) Patent No.: US 12,736,554 B2
(45) Date of Patent: Sep. 15, 2026

(54) SAMPLE CARRIER, SAMPLE STORAGES, LIFTING FORKS AND RELATED SYSTEMS FOR SAMPLE HANDLING AND PERFORMING THERMOMECHANICAL ANALYSIS OF A SAMPLE

(71) Applicant: Mettler-Toledo GmbH, Greifensee (CH)

(72) Inventors: Urs Joerimann, Bertschikon (CH); Samuel Keller, Neuhausen am Rheinfall (CH); Jonas Langenegger, Effretikon (CH); Michael Reber, Zurich (CH); Fabian Schneider, Zürich (CH); Urs Wuest, Hombrechtikon (CH); Gian Huber, Hinwil (CH)

(73) Assignee: Mettler-Toledo GmbH, Greifensee (CH)

( * ) Notice: Subject to any disclaimer, the term of this patent is extended or adjusted under 35 U.S.C. 154(b) by 346 days.

(21) Appl. No.: 18/589,746

(22) Filed: Feb. 28, 2024

(65) Prior Publication Data

US 2024/0319217 A1 Sep. 26, 2024

(30) Foreign Application Priority Data

Mar. 21, 2023 (EP) .................................... 23163070

(51) Int. Cl.
*G01N 25/16* (2006.01)
*G01N 35/02* (2006.01)
*G01N 35/04* (2006.01)

(52) U.S. Cl.
CPC ..... *G01N 35/026* (2013.01); *G01N 2035/041* (2013.01); *G01N 2035/0431* (2013.01)

(58) Field of Classification Search
CPC ..... G01N 2035/041; G01N 2035/0431; G01N 2035/0418; G01N 2035/0465;
(Continued)

(56) References Cited

U.S. PATENT DOCUMENTS 6,599,010 B1 7/2003 Suzuki
9,429,531 B2 8/2016 Neumann et al.
2019/0376914 A1 12/2019 Schindler

FOREIGN PATENT DOCUMENTS

CN 106226347 A * 12/2016 ............. G01N 25/16
CN 110514691 A * 11/2019 ............... G01B 7/02
(Continued)

OTHER PUBLICATIONS

Jahny, M. et al., Kaffeekanne Rationell mit Banddekor, URL https://brandenburg.museum-digital.de/pdf/object/36420.pdf?lang=de, 1969, 3 pages.

*Primary Examiner* — Robert R Raevis
(74) *Attorney, Agent, or Firm* — Standley Law Group LLP; Jeffrey S. Standley; Adam J. Smith

(57) ABSTRACT

A sample carrier includes a bottom, at least one side wall, and a contact face for receiving a sample. The side wall extends upward relative to the bottom. A circumferential rim is provided on the contact face. The sample carrier can be used in a sample handling system which includes a counterpart support element and a sample storage for receiving the sample carrier. Multiple sample storages are combined to sample storage rails with can be arranged on a sample storage shelf. The sample carrier can be part of a system for performing thermomechanical analysis, including the sample handling system while the samples, arranged in the sample carriers, are stored in the sample storages of the sample storage rails arranged in the sample storage shelves from where they are transported to the sample support with the help of the counterpart support element.

16 Claims, 4 Drawing Sheets

(58) Field of Classification Search
CPC .... G01N 25/16; G01N 25/20; G01N 35/0099; G01N 2035/00801; B01L 2200/025; B01L 2300/0803; B01L 9/52; B01L 9/00; B01L 9/06; B01L 3/50855; B01L 3/545; B01L 9/56
USPC ..... 374/10, 12, 208; 73/864.91, 81, 82, 803, 73/866
See application file for complete search history.

(56) References Cited

FOREIGN PATENT DOCUMENTS

| | | | | | |
|---|---|---|---|---|---|
| CN | 111189876 | A | * | 5/2020 | ............. G01B 11/02 |
| FR | 2754598 | A1 | * | 4/1998 | ............. G01N 25/16 |
| JP | H09257374 | A | * | 10/1997 | ............. G01N 25/16 |
| KR | 10-1869876 | B1 | | 6/2018 | |

* cited by examiner

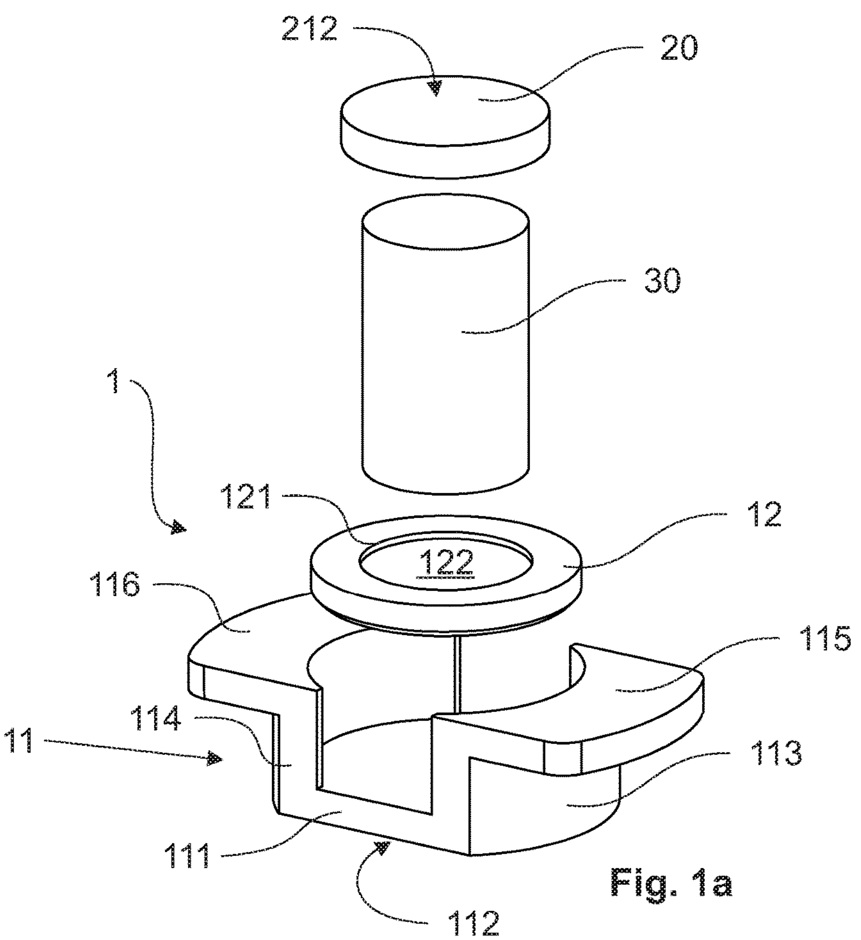
Fig. 1a
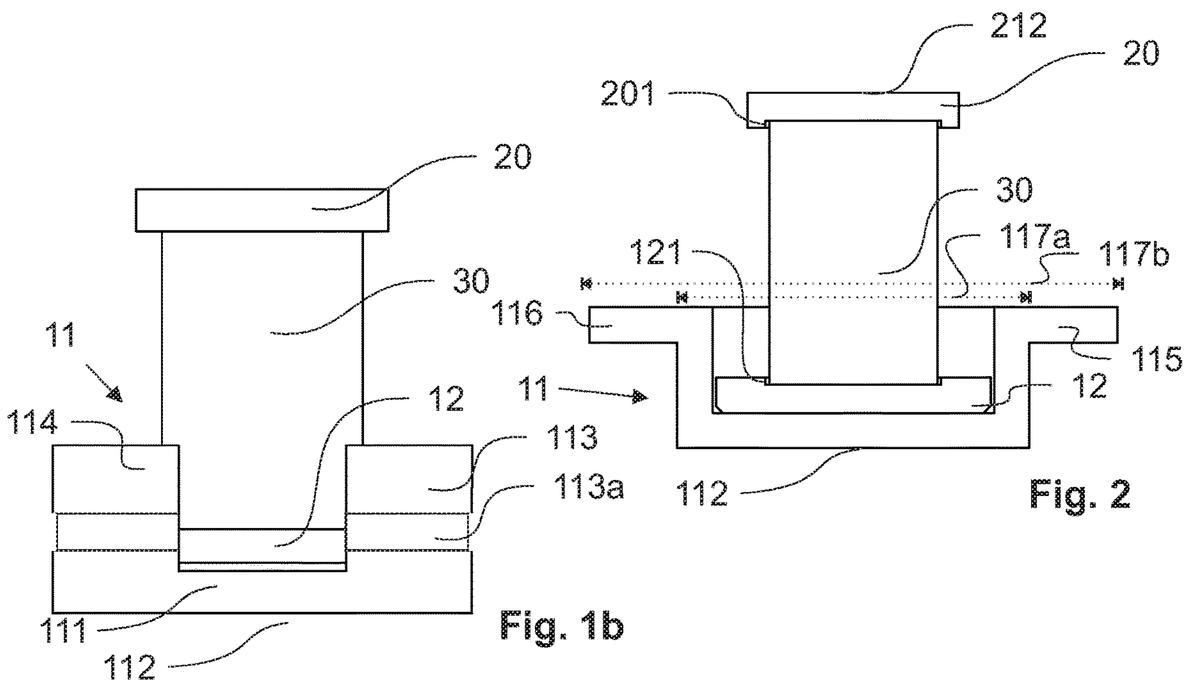
Fig. 1b
Fig. 2

61
613d
612
612a
612b
611
613a
613b
613c 61
116
1
20
612a
12
30

621
631
61
61
61
61
62
621
632
63
632
631
30
1
631

3
6
64
51
52
63
62
65
66
4

SAMPLE CARRIER, SAMPLE STORAGES, LIFTING FORKS AND RELATED SYSTEMS FOR SAMPLE HANDLING AND PERFORMING THERMOMECHANICAL ANALYSIS OF A SAMPLE

CROSS-REFERENCE TO RELATED APPLICATIONS

This application claims the benefit of European Patent Application No. EP 23163070.8 filed Mar. 21, 2023, the disclosure of which are hereby incorporated by reference as if fully restated herein.

TECHNICAL FIELD

The present disclosure relates generally to a sample carrier, in particular to a sample carrier for use in thermomechanical analysis, and related matter as set forth in the claims.

BACKGROUND ART

In thermomechanical analysis, most commonly a sample is placed on a sample support below a measuring probe, both made of a material having a small coefficient of thermal expansion. Preferred examples for such materials include, while not being limited to, for instance quartz or fused silica. The sample is then subjected to different temperatures. One measurement mode in using thermomechanical analysis is, for instance, the determination of thermal expansion coefficient of the sample. To that extent, the displacement of the measuring probe relative to the sample support is determined while the sample is subjected to different temperatures. In this measurement mode, the sample is frequently placed between two discs.

In other exemplary measurement modes, the sample may, for instance, be subjected to static or dynamic forces exerted by the measuring probe.

One drawback is seen in the fact that, most commonly, the sample needs to prepared manually, i.e., for instance be placed between two discs. The samples are usually small and thus difficult to handle. For one instance to be given, first a first disc is grabbed and placed on a sample support inside the thermomechanical analysis instrument with a pair of tweezers. Second, the sample is placed on the disc by means of the pair of tweezers. Third, a second disc is grabbed with the pair of tweezers and placed onto the sample. The skilled person will readily appreciate that it is thus a fiddly task to prepare and place samples for thermomechanical analysis.

It may be found desirable to automate placing samples into the measurement location of a thermomechanical analysis system, and also to remove the sample from there. DE 10 2012 105 101 suggests the use of a lift/swivel unit in connection with the analysis systems. However, DE 10 2012 105 101 is silent about how said lift/swivel unit would be specifically designed, and further silent about how sample holders or sample carriers could be designed to work in the context of the specific application.

SUMMARY OF INVENTION

It is an object of the present disclosure to provide the subject matter initially mentioned. In aspects, a sample carrier shall be provided which enables to prepare samples thereon for being placed in a thermomechanical analysis measuring location without the need for a further manual handling the sample as such. In other aspects, the sample carrier with the sample placed thereon shall be shaped and designed such that the sample can be securely positioned in an intended position. Furthermore, in still further aspects, the sample carrier shall be shaped and designed so as to be securely received and positioned within the thermomechanical analysis instrument. Still more specifically, the features enabling secure positioning of the sample on the sample carrier and the features enabling secure positioning of the sample carrier within the instrument shall be designed to securely define the position of the sample within the instrument. During the thermomechanical analysis, the sample is typically heated and cooled to temperatures between −150° and 1600° C. In a given instrument, the temperatures to which the sample is heated or cooled are preferably between −150° and 600° C., between −80° and 600° C., between 20° and 1100° C. or between 20° and 1600° C. The mechanical properties and the dimensions of the sample are in some embodiments observed at different temperatures and/or their change with the change of the temperature.

This is achieved, essentially, by the subject matter set forth in claim 1.

Further effects and advantages of the disclosed subject matter, whether explicitly mentioned or not, will become apparent in view of the disclosure provided below.

Accordingly, disclosed is a sample carrier comprising a bottom and at least one side wall extending upward relative to the bottom. The bottom may in specific instances be circular in cross-section. The sample carrier further comprises a contact face for receiving a sample. The contact face faces upward and is in particular provided on top of the bottom of the sample carrier or above the bottom of the sample carrier. A circumferential rim is provided on the contact face for receiving the sample within an area circumscribed by the rim and for defining the position of the sample relative to the bottom. Said area circumscribed by the rim may in particular be a recessed area. The contact face may be provided directly on the bottom of the sample carrier, or on a shim placed on the bottom of the sample carrier or on a bottom plate. Such a shim or bottom plate accordingly forms part of the sample carrier. The rim ensures that a sample arranged on the contact face remains in the intended, centred position while the sample carrier carrying the sample is moved from a storage and/or preparation position to a measurement location. Therefore, the rim allows that the sample preparation and detailed placement on the contact face can be done at a location different from the measurement location. In case that a sample has a diameter smaller than the area circumscribed by the rim, an additional ring-shaped shim can be provided. This additional ring-shaped shim can be introduced in the area circumscribed by another rim and thereby reduce the area in question.

Ensuring that a sample remains centred inside the sample carrier is beneficial for many thermomechanical measurements as the measuring probe should contact the sample or the measuring probe contact section. As most samples have only a diameter of a few millimetres, already small displacements can cause a failure of the intended measurement. Typical samples have a height between 0.1 and 10 mm and a diameter between 3 and 6 mm. Preferably, the inner diameter of a sample carrier has a diameter which is more than about 1 mm greater than the diameter of the greatest sample for which it is intended to be used. For example, the inner diameter of a sample carrier for typical samples is greater than 7 mm, preferably about 8 mm.

The circumferential rim creates a distance between a sample arranged in the sample carrier and the at least one side wall of it. This ensures the positioning of the sample inside the sample carrier and that the sample does not touch the side wall. A contact between the sample and side wall could affect the measurements of the thermomechanical properties. Preferably, the height of the circumferential rim is smaller than the height of the sample intended to be placed in the sample carrier for a thermomechanical measurement. Preferably, the shortest distance between the rim and the at least one side wall of the sample carrier is greater than 0.5 mm, most preferably greater or equal than 1 mm. As the sample is arranged on the area surrounded by the circumferential rim, this ensures the desired distance between sample and side wall.

For example, the circumferential rim has a height of less or equal to 0.5 mm, preferably between 0.2 and 0.4 mm and most preferably of about 0.3 mm. It was found that these dimensions are sufficiently high to position the sample securely while being at the same time sufficiently small to affect the thermomechanical properties.

It shall be noted that the bottom of the sample carrier as used within the context of the present disclosure shall mean a bottom wall of the sample carrier.

It is noted that expressions like top and bottom are clearly defined and readily conceivable for the person having skill in the art, as the sample carrier must be positioned so as to carry and support the sample on it.

The skilled person will readily appreciate how the suggested sample carrier enables a sample to be securely placed and positioned on the bottom of the sample carrier, or the shim or bottom plate placed thereupon, while the circumferential rim enables to move the sample carrier carrying a sample for handling and placing within a thermomechanical analysis instrument without dislocating the sample within the sample carrier and without the sample carrier distracting the thermomechanical measurements.

It is noted that within the framework of the present disclosure the use of the indefinite article "a" or "an" does in no way stipulate a singularity nor does it exclude the presence of a multitude of the named member or feature. It is thus to be read in the sense of "at least one" or "one or a multitude of".

It is moreover noted that in the context of the present application the terms "bordering" and "adjacent" as well as "bordering" and "adjacent to" are considered as synonyms.

In embodiments, the sample carrier further comprises at least one lug laterally cantilevering from the at least one side wall. The lug enables the sample carrier to be supported on suitable counterpart support elements in an instrument and/or of a tool for handling the sample carrier. A counterpart support element is preferably a lifting fork. In further aspects, the lug and of the counterpart support elements may be shaped so as to jointly force the sample carrier into a unique position relative to the instrument and further to securely hold the sample carrier in said unique position. Preferably the at least one lug of the sample carrier may extend into two opposite lateral direction. In this embodiment, the at least one lug preferably extends parallel to the bottom of the sample carrier. The parts of the at least one lug extending into two opposite lateral directions are referred to as "lug sections" in the following. The lug sections can be part of the same lug, which is for example the case if the lug is ring shaped or they can be part of two separate lugs. This embodiment has the advantage that the sample carrier can simply be lifted by pushing it upwards on both wings in parallel. Therefore, the counterpart support element be a fork or a similar passive device with which the sample carrier can be lifted smoothly and with little risks for shocks which could be created by closing a clamping device or by collisions between the lug and the counterpart support element if very precise relative motions are needed to grab the sample support. Shocks increase the risk that a sample arranged in the sample carrier dislocates unintentionally whereby it cannot be measured anymore. The lug extending parallel to the bottom has the advantage that the risk of a collision between the counterpart support element and the sample carrier is even further reduced. Further, together with a suitable counterpart support element, it allows to centre the sample carrier with respect to the counterpart support element by shifting while being supported.

In embodiments the at least one lug is formed by two wings extending into opposite lateral directions. Wings are lugs extending parallel to the bottom of the sample carrier. Preferably, the bottom of the wings is planar. The use of two wings allows to construct the sample carrier with a partially interrupted side wall which facilitates the placement of the sample into the sample carrier.

In further aspects, the at least one side wall may comprise at least two separate side wall segments. Preferably, on each of two opposed sides of the sample carrier, there is at least one lug which laterally cantilevers from a subset of the two side wall segments. In particular embodiments, exactly two separate side wall segments may be provided, i.e., one side wall segment on each of two opposing sides of the sample carrier. This embodiment exposes the sample more directly to the surrounding as it is only partially shielded by the sample carrier side walls. This can reduce the time needed for the thermomechanical measurements.

At least a partial area of the bottom may be configured as a support contact section extending, at least, from a top surface of the bottom of the sample carrier to a bottom surface of the bottom of the sample carrier in at least said partial area of the bottom of the sample carrier. At least the support contact section may consist of a material having a coefficient of linear thermal expansion of $50 \cdot 10^{-6}$/K or less, preferably $10 \cdot 10^{-6}$/K or less, at room temperature, more preferably in a temperature range from −150° C. to 1100° C. Said materials may include, while not being limited to, such as fused silica or quartz, sapphire, or ceramics such as Alox. Alox is understood by a skilled person as a ceramic comprising at least 96% by mass of aluminum oxide. In one instance, Alox might be the material specified as Alox G by https://htc-ceramics.com/materiali/alox-g/?lang=en by the priority date of the present document. Other materials may include, while not being limited to, sapphire or Invar. Invar is an alloy consisting of 64 weight-% iron and 36 weight-% nickel, and is known for its low coefficient of thermal expansion. A low coefficient of linear thermal expansion of the bottom of the sample carrier increases the precision of the thermomechanical measurement. In some embodiment, the thermomechanical properties of a sample at room temperature are desired and therefore it is sufficient if the coefficient of thermal expansion of the bottom of the sample carrier is low around this temperature. However, it is desirable that the sample carriers are well suited for a wide variety of measurements and therefore, materials with a low coefficient of thermal expansion over the suggested large temperature range.

At least the support contact section may consist of quartz or fused silica if the sample carrier is suitable for the use in a thermomechanical measurement process with temperatures up to 1100° C. At least the support contact section may consist of ceramic, preferably Alox, or of sapphire, if the sample carrier is suitable for the use in a thermomechanical measurement process with temperatures above 1100° C. and typically below 1600° C.

It may be provided that the support contact section extends over the entire bottom of the sample carrier. It may moreover, be provided that the support contact section is integrally provided, i.e., seamless, in one piece, or monolithic, with the at least one side wall and the at least one lug. This has the advantage, that there are no differences in the thermal expansion of the different parts of the sample carrier.

In embodiments, the bottom of the sample carrier and the at least one side wall are integrally provided, i.e., in one single piece and/or seamless and/or monolithic, and integrally include the support contact section. Preferably, the at least one lug is also integrally provided with the bottom and the at least one side wall. Preferably, in said specific embodiments, the bottom of the sample carrier, the support contact section and the at least one side wall consist, in particular consist entirely, of the same material having a coefficient of linear thermal expansion of $50 \cdot 10^{-6}$/K or less, more preferably $10.10^{-6}$/K or less, at room temperature, more preferably in a temperature range from −150° C. to 1100° C. Preferably the at least one lug consists of the same material as the bottom and the at least one side wall. This has the advantage, that there are no differences in the thermal expansion of the different parts of the sample carrier.

For all references to a material having a coefficient of linear thermal expansion of $50 \cdot 10^{-6}$/K or less, preferably $10.10^{-6}$/K or less, at room temperature, more preferably in a temperature range from −150° C. to 1100° C., the material may in more particular have a coefficient of linear thermal expansion of $1 \cdot 10^{-6}$/K or less at room temperature, more preferably in a temperature range from −150° C. to 1100° C., as is the case, for instance, for fused silica or quartz.

It may be provided that the sample carrier further comprises a shim. The shim comprises the circumferential rim. The shim consists preferably of a material having a coefficient of linear thermal expansion of $50 \cdot 10^{-6}$/K or less, preferably $10 \cdot 10^{-6}$/K or less, at room temperature, more preferably in a temperature range from −150° C. to 1100° C. Examples of specific materials fulfilling this requirement are given above. It may further be provided that the shim may consist of the same material as at least the support contact section. Providing a separate shim may be beneficial in manufacturing the circumferential rim by machining, as only the shim needs to be clamped on the tooling machine. The outer contour of the shim is preferably complementary to a shape defined by the at least one side wall and/or the bottom such that the position of the shim relative to the bottom and the at least one side wall is defined. An additional ring-shaped shim can be used together with the shim to adapt the area circumscribed by the rim to the sample.

In a preferred embodiment the shim comprises the contact face and the circumferential rim. This has the advantage that a melting or decomposing sample does not necessarily soil the bottom of the sample carrier. In this embodiment, the shim is preferably an integral piece. The shim has preferably the shape of a disc or plate with a rim. An additional ring-shaped shim can be used together with the shim of this embodiment to adapt the area circumscribed by the rim to the sample.

In another preferred embodiment the shim preferably comprises the circumferential rim while the contact face is provided by the bottom of the sample carrier. The shim is in this embodiment ring shaped. This has the advantage that shims can be easily produced and therefore be provided in a great variety of sizes. In another embodiment, a ring-shaped shim is used in combination with one or more additional ring-shaped to adapt the area circumscribed by the rim to the sample.

In further instances, it may be provided that the shim is removably placed on the bottom of the sample carrier. This yields in the advantage that the shim may be replaced with another shim with, for instance, a differently dimensioned circumferential rim, and thus the sample carrier may be readily adapted to different sample sizes by solely changing the shim. Additional ring-shaped shims can be used to allows a further adaption to the size of the sample. The outer contour of the shim is preferably complementary to a shape defined by the at least one side wall and/or the bottom such that the position of the shim relative to the bottom and the at least one side wall is defined.

In still another aspect, it may be provided that the shim consists of the same material as the bottom of the sample carrier and the at least one side wall or consists of a material having a coefficient of thermal expansion not deviating by more than 10% from that of the material of the bottom, the at least one side wall. Preferably, the at least one lug consists of the same material as the bottom and the at least one side wall. In other embodiments, however, it may be provided that the shim and the bottom of the sample carrier consist of a material having a coefficient of thermal expansion which is less than the coefficient of thermal expansion of the material of the at least one side wall and preferably the at least one lug. Preferably, it may be provided that the shim and the bottom of the sample carrier consist of a material having a coefficient of thermal expansion of less than $1 \cdot 10^{-6}$/K and the at least one side wall and preferably the at least one lug consist of a material having a coefficient of thermal expansion of $1 \cdot 10^{-6}$/K up to $50 \cdot 10^{-6}$/K, more preferably $1.10^{-6}$/K up to $10.10^{-6}$/K, at room temperature, more preferably in a temperature range from −150° C. to 1100° C. This yields the benefit that for the at least side wall and preferably the at least one lug, which have a more complex geometry than the bottom of the sample carrier and/or the shim, a material may be chosen which is easier to machine than that of the bottom of the sample carrier and of the shim.

In still further embodiments, the sample carrier may comprise a carrier frame. The carrier frame in turn comprises the at least one side wall and preferably the at least one lug. The shim extends through and/or at least partially defines the bottom of the sample carrier and provides the support contact section. It may, in another aspect, when describing the same embodiment, be said that the at least one shim is an insert which is inserted into an open bottom of the carrier frame. Preferably, the shim comprises the contact face.

Instill further embodiments, the sample carrier may comprise a carrier frame. The carrier frame in turn comprises the at least one side wall and preferably the at least one lug. A ring-shaped shim is arranged on a bottom plate such that bottom plate forms the contact face of the sample carrier while the ring-shaped shim forms the circumferential rim. The bottom plate comprising the contact face extends through and/or at least partially defines the bottom of the sample carrier and provides the support contact section. It may, in another aspect, when describing the same embodiment, be said that the at least one bottom plate is an insert which is inserted into an open bottom of the carrier frame. The outer contour of the bottom plate and the shim are preferably complementary to a shape defined by the at least one side wall and/or the bottom such that the positions of the bottom plate and the shim relative to the bottom and the at least one side wall are defined. In another embodiment, the contour of bottom plate is complementary to the contour of the shim and either the outer contour of the bottom plate or the outer contour of the shim is complementary to a shape defined by the at least one side wall and/or the bottom. In this embodiment, the position of the shim relative to the bottom plate is defined due to the complementary shapes and the common position of bottom plate and shim is defined due to the complementary shape of either bottom plate or shim with the side wall and/or the bottom.

The use of a carrier frame allows to choose the material of the carrier frame for its mechanical properties and its ease of construction while choosing the materials of the shim and/or the bottom plate based on their interaction with the sample support and their thermal expansion properties. A modular system where the bottom plate and a ring-shaped shim can be separated allows the user to adapt the sample carrier easily to the sample in question and facilitates the production. Preferably, the side wall of the sample carrier is suitable to guide and centre the shim and/or the bottom plate.

In more specific aspects of the precedingly described embodiment, the carrier frame may comprise a rim section of the bottom of the sample carrier which encircles an aperture. The aperture may in particular be a central aperture provided centrally through the bottom of the sample carrier. The shim or the bottom plate may be plug-shaped and comprise a peg section received within and extending through the aperture and a top bearing section bearing on the rim section of the bottom of the sample carrier. In more specific aspects, the peg section extends from top beyond a bottom face of the rim section.

In embodiments wherein the sample carrier comprises a carrier frame and the support contact section is provided on a separate shim or a separate bottom plate, the carrier frame may consist of a material different from the shim or the bottom plate. Preferably, the carrier frame consists of a metal, most preferably of steel. Metals such as steel can be brought into the desired shape efficiently and with sufficient precision while being resistant to the temperatures occurring during the thermomechanical measurement. As the carrier frame is not part of the measuring section, its material is not limited to material having a low or well-known coefficient of thermal expansion. The measuring section is the distance between the sample support and the measuring probe during the measurement process. It is the part of the sample carrier between the support contact section and the contact face and, if present, the cover plate in the region below the measuring probe contact section which will be in the measuring section during the measurement. Besides of these parts of the sample carrier, only the sample is arranged in the measuring section.

In providing a support contact section having a low coefficient of linear thermal expansion, the measurement result obtained from the displacement of the measuring probe relative to the sample support corresponds, as closely as possible, to, for instance, the thermal expansion of the sample. Highest accuracy, as will be appreciated, will be achieved when any elements placed between the measuring probe and the sample support, apart from the sample, of course, consist of the same material as the measuring probe and the sample support. Otherwise, a numeric correction of the measurements might be required, which again is the more accurate the closer the coefficient of thermal expansion of the elements placed between the measuring probe and the sample support, apart from sample, is to the coefficient of thermal expansion of the measuring probe respectively the sample support.

In another aspect, the sample carrier comprises a cover plate. The cover plate comprises a circumferential rim provided on a face of the cover plate and circumscribes an area, wherein the area circumscribed by the rim of the cover plate is congruent with the area circumscribed by the rim provided on the contact face of the sample carrier. The area circumscribed by the rim of the cover plate may in particular be a recessed area. The measuring probe contact section is provided on the cover plate. Accordingly, a sample having a cross-sectional shape according to that of the areas circumscribed by the rims can be placed and secured inside the rims of the contact face of the sample carrier and of the cover plate. The cover plate may serve, for instance, to avoid a heated sample to stick to a measuring probe. The rim of the cover plate prevents that it slips of the sample when the sample carrier is handled.

The use of a sample carrier comprising a contact face has the advantage that the sample support is protected by the contact face against contamination by the sample and the contact face ensures further that the force created by the sample support is equally distributed on the sample. In the presences of a cover plate, these advantages are also given with respect to the measuring probe: The measuring probe is protection against contamination by the sample by the cover plate and the force of the measuring probe is equally distributed over the whole sample.

In embodiments, the cover plate may consist of the same material as that of the bottom of the sample carrier or a material having a coefficient of thermal expansion not deviating by more than 10% from that of the material of the bottom of the sample carrier.

In other embodiments, the sample carrier may be a sample carrier comprising a shim or a bottom plate. It may be provided that the cover plate consists of the same material as the shim or the bottom plate or of a material having a coefficient of thermal expansion not deviating by more than 10% from that of the material of the shim. This may include instances in which the cover plate in addition consists of the same material as that of the bottom of the sample carrier or a material having a coefficient of thermal expansion not deviating by more than 10% from that of the material of the bottom of the sample carrier.

In a preferred embodiment, all materials of the sample carrier which are arranged between the support contact section and the contact face and preferably the measuring probe contact section are the same or do not deviate by more than 10% in their coefficient of thermal expansion. In this embodiment, all materials in the measuring section which are not part of the sample are the same. This allows to correct the measurements for the effects caused by the sample carrier in a particular easy way.

In another aspect, the herein disclosed subject matter relates to a lifting fork. The lifting fork is suitable to hold a sample carrier comprising at least one lug which extends into two opposite lateral directions. Preferably, it is suitable to hold a sample carrier comprising two wings. The lifting fork comprises a pair of prongs laterally offset from each other. The lateral distance between the prongs of the pair of prongs is greater than the shortest distance between the lug sections and smaller than the greatest distances between the same pair of lug sections. The height of the prongs is preferably smaller than the clearance below the respective lug sections of the sample carrier, whereby the clearance is the height of the underside of the respective lug sections above the plane defined by the support contact section of the bottom of the sample carrier. With this configuration, the lifting fork is suitable for lifting a sample carrier and place the sample carrier inside the thermomechanical analysis instrument and also to remove the sample carrier from the instrument. The lifting fork may in some aspects be a lifting fork for manual operation and may, to this extent, be a separate instrument. In other embodiments, the lifting fork may be coupled to the instrument via a drive, which would enable to automatically place samples inside the thermomechanical analysis instrument and to remove samples from the thermomechanical analysis instrument.

Preferably, the length of the prongs is approximately the same as the length of the at least one lug of the sample carrier for which the lifting fork is intended, measured in the direction perpendicular to the direction in which the at least one lug extend laterally on opposing sides.

Preferably, the prongs and are connected by a U-shaped connection. The U-shaped rises perpendicular to the plane defined by the prongs. In this embodiment, the U-shaped connection forms a limit stop to the sample carrier as the at least one lug will contact the U-shaped connection when the sample carrier is arranged with its at least one lug onto the prongs. The height of the U-shaped connection is preferably greater than the height of the highest samples for which the lifting fork and the corresponding sample carriers are intended to be used. This has the advantage that the risk of collisions of the lifting fork with cover plates is minimized and the U-shaped connection can be used as a reference or cross-check when determining the height of the sample with a sample height detection unit.

Preferably, the shortest and the largest distance between the lug sections are measured along the line along the opposite directions in which they extend.

The lifting fork is one example of a counterpart support element. Other examples comprise gripping or holding means which can either be gripping means to clamp to the at least one lug of the sample carrier or to grip at least one side wall. Besides gripping means also further way of holding the sample carrier can be used by holding means such as suction cups or hooks acting on either the side wall or the lug.

In another aspect, the herein disclosed subject matter relates to an active counterpart support element. An active counterpart support element can for example comprise gripping means or holding means such as suction cups. Active counterpart support elements comprise an actuator to get hold of a sample carrier. The use of such active counterpart support elements lowers the requirements on the shape of the sample carriers. Thereby, smaller sample carriers can be used, which might lower the requirements on the heating system and may reduce the measurement time.

Further, the herein disclosed subject matter relates to a passive counterpart support element. A passive counterpart support element can for example comprise a hook or a surface to support a sample carrier. Passive counterpart support elements position themselves in a particular way relative to a sample carrier to hold it. The use of such passive counterpart support element lowers the requirements on the counterpart support element but requires that it can be positioned precisely. By avoiding the action of an actuator for getting hold on the sample carrier, shocks are avoided which may cause a sample in the sample carrier to fall over. A lifting fork is an example of a passive counterpart support element.

In another aspect, the herein disclosed subject matter relates to a sample storage for storing and proving sample carriers. The sample storage comprises a storage bottom and a storage side wall. The storage side wall surrounds the storage bottom at least partially. The storage side wall is chamfered in an upper section and preferably upright in a lower section. The storage side wall is interrupted at least on a front side such that there are at least one, preferably at least two vertical gaps. The distance and the chamfer of the side wall is such that a sample carrier is guided to a defined position inside the sample storage when it is placed on the bottom of the sample storage. The use of such a sample storage allows on the one hand to store the sample carriers. Further, it facilitates the automatization of the sample handling as it provides the sample carrier at a well-defined position. By placing the sample carrier in the sample storage and lifting it again with the help of a counterpart support element such as passive counterpart support element, preferably a lifting fork, a desired relative position of the counterpart support element and the sample carrier is established. If an active counterpart support element such as a gripper is used, the resistance experienced while lowing a sample support in a sample storage can be used to adjust the coordinate system of the counterpart support element with respect to the sample storage and, if applicable, the thermomechanical instrument attached to it.

An upright lower section of the side walls can protect the sample carrier from tipping over when the sample storage is handled. A single gap is sufficient to define the alignment of a counterpart support element, such as a lifting fork. However, in the case of a counterpart support element which extends in lateral direction as much as the diameter of the sample carrier bottom, such as it is the case with two prongs of a lifting fork, using multiple, especially two gaps, one for each prong or similar gripping or holding means of the counterpart support element, allows to provide more chamfered side walls to align the sample carrier and it is therefore preferred.

The at least one vertical gap preferably allows gripping or holding means of a counterpart support element, preferably prongs of a lifting fork, to move in- and out of the sample storage with a first and a second motion, whereby the first motion is perpendicular to the plane defined by the storage bottom and whereby the second motion is parallel to the plane defined by the storage bottom and perpendicular to the front side.

In another aspect, the herein disclosed subject matter relates to a sample storage rail. The sample storage rail comprises a plurality of sample storages. The sample storages are arranged side by side and all storage bottoms are arranged in a single plane. Preferably, the sample storage rail is equipped with at least one handle. Preferably, the sample storages are arranged in a line whereby they are in the same orientation.

The orientation is preferably defined by the at least one vertical gap. In this case, the second motions relative to every one of the sample storages are parallel to each other. In another embodiment, the sample storages are arranged in a circle segment, oriented towards the centre of this circle. In this case, the second motions relative to every one of the sample storages are radial motions with respect to the common centre.

The use of a sample storage rail allows to prepare the sample carriers at a convenient place and to transport them together to the measurement instrument. It facilitates the automation. Arranging the sample storages such that the bottoms are arranged in a single plane facilitates the automations as the motion in the vertical direction can be the same for all sample storages. Arranging the sample storages such that the second motions are either parallel to each other or radial to a common centre facilitates the automation even more, as also a second motion is the same for all sample storages and it is only the position on a third axis which differs.

In another aspect, the herein disclosed subject matter relates to a sample storage shelf. The sample storage shelf comprises one or more platforms arranged in levels. Each platform is sized and shaped to receive a sample storage rail. Each platform is preferably equipped with shelf side walls. Most preferably, at least some of the shelf side walls comprise a gap which is suitable to receive at least a part of the handle of a sample storage rail, if it is arranged on the one of the one or more platforms.

Arranging sample storage rails in levels allows to remove the sample carriers by an upwards motion in all cases. Arranging the sample storage rails on the sample storage shelf requires in general only a downward motion of the rail and therefore minimizes the risk of hitting the rail against part of the shelf or against another rail which might cause the samples arranged in the sample carriers to tip over or to lose the cover plates. Providing shelf side walls is an easy way to stabilize the rail on the platforms and to ensure a predefined arrangement which is beneficial for an automated sample handling system. Providing gaps for handles of the storage rails in the side walls allows on the one hand to arrange the handles at a place where they do not hinder the access to other sample storage rails arranged on the shelf and on the other hand, the partial arrangement of the handles in the gaps define and secure the position of the sample storage rails with respect to the direction of the second motion.

Preferably, the sample storage rails are such that the second motions of the sample storages are parallel to each other. In this case, the sample storage shelf has a staircase-like shape. Every one of the platforms can have the same shape and therefore, the user can interchange which one of multiple storage rails is arranged on which platform. This facilitates the sample management.

Preferably, the sample storage shelf comprises tempering ducts below the platforms. The tempering ducts allow the circulation of a fluid with a desired temperature. Thereby, the temperature of the samples arranged in the samples carriers arranged in the sample storages of the sample storage rails arranged on the platforms of the sample storage shelf can be controlled. This allows the automation as the temperature control can increase the time during which the samples can be stored before being measured.

In another aspect, the herein disclosed subject matter relates to a sample handling system. The sample handling system comprises a counterpart support element and a sample storage. Preferably, the sample storage is part of a sample storage rail, such that the sample handling system comprises a sample storage rail. Preferably, the sample storage is part of a sample storage rail arranged on a sample storage shelf, such that the sample handling system comprises a sample storage rail and a sample storage shelf. The position and size of the at least one vertical gap on the front side of the sample storage is adapted to the counterpart support element in such a way that the counterpart support element can access and support a sample carrier located inside the sample storage in order to remove it or to place it inside. By providing the at least one vertical gap with desired tolerances, a misalignment of the counterpart support element or its range of motion can be detected, as it may collide with the sample storage if the misalignment is greater than the desired tolerance. Instead of detecting the collision as a mean to detect the misalignment, the counterpart support element may be equipped with sensors detecting the proximity or presence of the storage side wall, for example by closing an electric circuit or by observing reflected light.

Preferably, the sample storage is part of a sample handling system comprising a lifting fork as counterpart support element and a sample carrier comprising at least two lug sections. In this case, the at least one gap allows the prongs of the lifting fork to move in- and out of the sample storage with a first motion perpendicular to a plane defined by the storage bottom and with a second motion parallel to the plane defined by the storage bottom and perpendicular to the front side. In this embodiment, a sample can be lifted out of the sample storage by moving the prongs starting from a lower position with the second motion into the sample storage. The prongs of the lifting fork are below the lug sections. Lifting the prongs upwards with a first motion in an upper position, the prongs contact the lug sections and thereby the whole sample carrier is lifted and can be transported to a desired space. Assuming that a sample carrier which is slightly shifted on the prongs with respect to its ideal position is lowered into the sample storage, the sample carrier will touch the chamfered section of the storage side wall. Due to the chamfer, this causes a sliding motion of the lug sections on the prongs until the sample carrier is well aligned with respect to the sample storage. As the motion of the prongs is limited by the gap, it is also well aligned with the sample storage. Therefore, prongs and sample carrier are also well aligned to each other after this insertion action.

In a preferred embodiment, the sample handling system comprises further a sample carrier which can be arranged in a sample storage which is part of a sample storage rail which can preferably be arranged on a sample storage shelf. The counterpart support element is preferably a lifting fork or an active counterpart support element such as a gripper or a suction cup suitable for acting on the side wall of a sample carrier. The sample handling system comprises preferably a drive. The counterpart support element and the at least one lug and/or side wall of the sample carrier are adapted to each other such that the counterpart support element can support and handle the sample carrier. The at least one gap on the front side of the sample storage and the counterpart support element are adapted to each other such that the counterpart support element can access the at least one lug and/or the at least one side wall of the sample carrier when the sample carrier is arranged in the sample storage. The position of the sample storage is defined with respect to the sample storage rail. The position of the sample storage rail is defined with respected to the counterpart support element, preferably by a common mounting base. Preferably, the counterpart support element is mounted to a drive which is mounted to the mounting base and the sample storage rail is arranged in a known manner on a platform of a sample storage shelf which is mounted to the mounting base. This sample handling system allows to remove and place sample carrier from and into the sample storage with the help of the counterpart support element moved by the drive in an automated manner.

In another aspect, the herein disclosed subject matter relates to a system for performing thermomechanical analysis of a sample. The system comprises a thermomechanical analysis instrument and a sample carrier of any kind set forth above. The thermomechanical analysis instrument comprises a sample support and a measuring probe with a measuring probe tip pointing towards the sample support. The sample carrier is during a measurement arranged between the sample support and the measuring probe. In a preferred embodiment, during a measurement, the bottom of the sample carrier is supported by the sample support while the measuring probe tip contacts either the sample arranged in the sample carrier, or the cover plate located on top of the sample which is arranged in the sample carrier.

In one embodiment, the system further comprises a counterpart support element, which is arranged and configured to receive the at least one lug of the sample carrier. In the case of a sample carrier comprising two wings, each of two opposing wings of the sample carrier can be arranged on one of two prongs forming the counterpart support element. When the lug of the sample carrier is received by the counterpart support element, a sample arranged in the sample carrier is placed on a connection line between the measuring probe tip and the sample support.

In one embodiment, the system further comprises a placement counterpart support element, which is arranged and configured to receive the sample carrier. When the sample carrier is received by the placement counterpart support element, a sample arranged in the sample carrier is placed on a connection line between the measuring probe tip and the sample support.

In one embodiment, the system further comprises a placement counterpart support element, which is arranged and configured to receive the at least one lug of the sample carrier. In the case of a sample carrier comprising two wings, each of two opposing wings of the sample carrier can be arranged on one of two prongs forming the placement counterpart support element. When the lug of the sample carrier is received by the placement counterpart support element, a sample arranged in the sample carrier is placed on a connection line between the measuring probe tip and the sample support.

A placement counterpart support element allows to hold the sample carrier in the desired position inside the thermomechanical analysis instrument. The placement counterpart support element can be the same support element with which the sample carrier was moved into the thermomechanical analysis instrument, or it can be a separate counterpart support element. Preferably, the placement counterpart support element is a passive counterpart support element, as the lack of an actuator increases the reliability under the measurement conditions.

In one embodiment, at least the support contact section, and preferably if present the cover plate, of the sample carrier consists of the same material as the measuring probe and/or the sample support or of a material having a coefficient of thermal expansion not deviating by more than 10% from that of the material of the measuring probe and/or the sample support. In a preferred embodiment, the material of the measuring probe equals the material of the sample support and both equal the material of the bottom of the sample carrier and the material of the cover plate. In one preferred embodiment, all parts of the sample carrier which are intended to be inside the measuring section during the measurement are made of the same material as the sample support and the measuring probe. This facilitates the interpretation of the results as the sample carrier behaves as if it were a part of the sample support or the measuring probe during the measurement.

In a preferred embodiment, the system for performing thermomechanical analysis of a sample comprises a sample handling system. In a preferred embodiment, the system for performing thermomechanical analysis of a sample comprises a sample storage in which the sample carrier is provided. Most preferably, the sample carrier is moved from the sample storage to the sample support and back with the counterpart support element, preferably a passive counterpart support element, most preferably in the form of a lifting fork, and with a drive. In another embodiment, the sample carrier is moved from the sample storage to the sample support and back with the active counterpart support element, preferably in the form of a gripping device or a suction cup, and with a drive. Therefore, there is no need for the user to arrange the sample on the sample support inside the instrument by hand. In another embodiment, the user moves the counterpart support element, which is preferably a passive counterpart support element, such as a lifting fork or an active counterpart support element, by hand, instead of by a drive. This increases the control by the user while still supporting him and allowing him to prepare the sample in advance outside of the instrument which facilitates the measurement.

Most preferably, the sample carrier is moved from the sample storage to the sample support and from the sample support to a waste location with the counterpart support element and with a drive. The counterpart support element can be an active or a passive counterpart support element. The waste location is preferably a second sample storage, a bin, or a surface where the sample carriers are placed after being removed from the sample support. By placing sample carriers after the measurement in a waste location and thereby outside of the sample storage in which they were provided for the measurement, the user can easily detect which samples were already measured. Further, he can refill empty sample storages during a measurement without risking a collision.

In a preferred embodiment, the system for performing thermomechanical analysis of a sample comprises a sample height detection unit. The counterpart support element, and preferably the drive, is equipped to transport the sample carrier to the sample high detection unit. The sample height detection unit is suitable to detect the height of the sample, preferably in units of the drive of the counterpart support element. Preferably, this information is transmitted to a control unit of the system for performing the thermomechanical analysis which uses it to control the measuring probe at least before the sample carrier is place on the sample support. Preferably, the sample height detection unit is a light gate which is arranged in such a way that the drive can move the sample carrier with the help of the counterpart support element in a vertical direction through the light gate. The sample height can be determined by the position of the drive before and after the light gate detects an interruption. As the position of the bottom of the sample carrier with respect to the counterpart support element is known, the light gate can be used to detect only the upper end of the sample carrier by for example moving the sample carrier from below through the light gate and detecting the first interruption of the light signal and the position of the drive in this instance or vice versa by moving the sample carrier downwards and detecting the first instance on which the light signal appears. In a preferred embodiment, the sample height is measured by detecting both, the lower and the upper end of the sample carrier by moving the sample carrier along its length through the light gate and measuring either the change in the position of the drive or the duration during which the signal was interrupted and the speed of the motion. By comparing the sample height calculated from the theoretical position of the bottom of the sample carrier and the measured upper end position with the sample height determined by measuring both ends can help to detect an unintended offset in the absolute coordinate system of the drive and counterpart support element.

In a preferred embodiment, the system for performing thermo mechanic alanalysis of a sample comprises a drive functionally coupled with the counterpart support element, preferably a passive counterpart support element, most preferably a lifting fork. The drive is configured to move the counterpart support element such as to get hold of the sample carrier. Preferably, the drive is configured to move the lifting fork to place lug sections of a sample carrier comprising at least two lug sections above the prongs of the lifting fork and to lift the sample carrier up. The drive is preferably configured to move the sample carrier out of a sample storage. The drive is further configured to move the sample carrier into a measurement location between the measuring probe and the sample support and to place the sample carrier on the sample support or on the placement counterpart support element in the measurement cell. The system comprises preferably a sample height detection unit through which the sample carrier comprising the sample is moved by the drive. Thereby the sample height can be measured. The control unit of the thermomechanical analysis instrument preferably adapts the position of the measuring probe and/or the sample support in reaction to the detected sample height.

In another preferred embodiment, the system for performing thermomechanical analysis of a sample comprises a drive functionally coupled with the active counterpart support element, preferably a gripper. The drive is configured to move the counterpart support element such as to get hold of the sample carrier. Preferably, the drive is configured to move the active counterpart support element such that it can get hold of the at least one side wall of the sample carrier and to lift the sample carrier up. The drive is preferably configured to move the sample carrier out of a sample storage. The drive is further configured to move the sample carrier into a measurement location between the measuring probe and the sample support and to place the sample carrier on the sample support or on the placement counterpart support element in the measurement cell. The system comprises preferably a sample height detection unit through which the sample carrier comprising the sample is moved by the drive. Thereby the sample height can be measured. The control unit of the thermomechanical analysis instrument preferably adapts the position of the measuring probe and/or the sample support in reaction to the detected sample height.

It is understood that the features and embodiments disclosed above may be combined with each other. It will further be appreciated that further embodiments are conceivable within the scope of the present disclosure and the claimed subject matter which are obvious and apparent to the skilled person by virtue of the present disclosure.

BRIEF DESCRIPTION OF DRAWINGS

The subject matter of the present disclosure is now to be explained in more detail by means of selected exemplary embodiments shown in the accompanying drawings. The figures show FIG. 1*a* An exemplary embodiment of a sample carrier of the herein described type with a cover plate, with a sample installed between the contact face of the sample carrier and the cover plate, in an exploded view;

FIG. 1*b* A second exemplary embodiment of a sample carrier of the herein described type with a cover plate, with a sample installed between the contact face of the sample carrier and the cover plate, in a side view;

FIG. 2 the device of FIG. 1*a* in an assembled state, in a sectional view;

Figure 3:
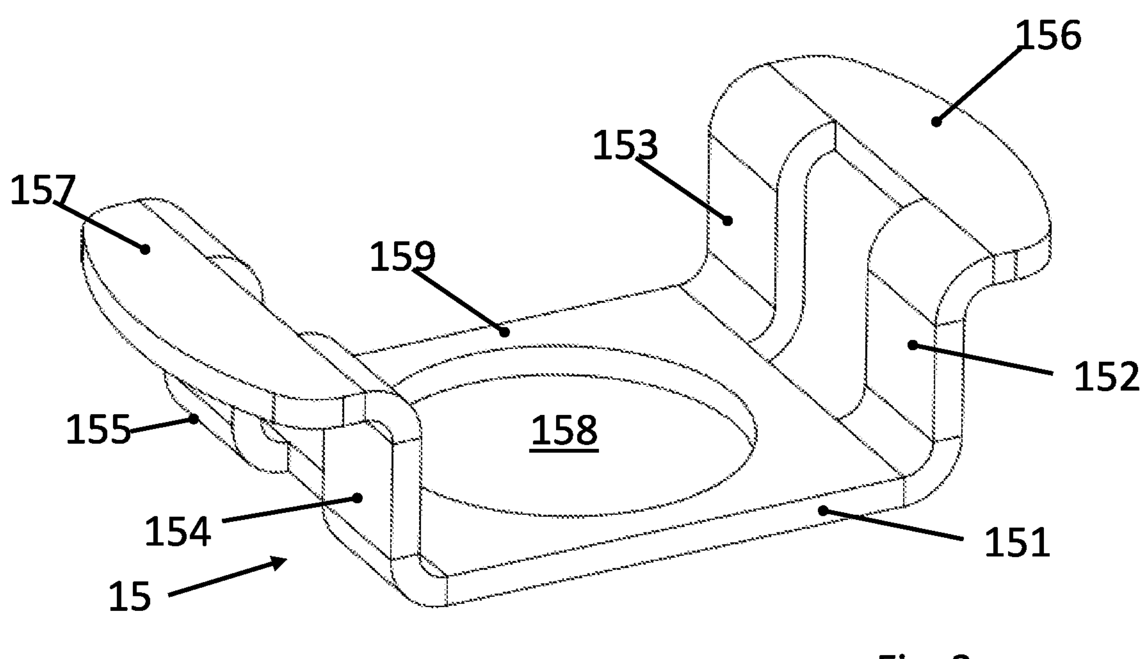
FIG. 3 a carrier frame of a sample carrier according to some herein described embodiments.

It is understood that the drawings may be highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

DESCRIPTION OF EMBODIMENTS

FIG. 1*a* shows an exploded view of a first embodiment of a sample carrier 1 and cover plate 20, with a sample 30 installed. Sample carrier 1 is a two-piece sample carrier, comprising sample carrier bowl 11 and a shim 12. Sample carrier bowl 11 forms the bottom 111 of the sample carrier 1 and comprises two side wall segments 113 and 114 extending upward from bottom 111, and one lug 115 laterally extending from side wall segment 113 in a first lateral direction of sample carrier 1 and a further lug 116 laterally extending from side wall segment 114 in a second lateral direction of sample carrier 1 opposite the first direction into which lug 115 extends. Bottom 111 further provides and includes in this non-limiting embodiment, the support contact section 112 which is intended to be brought into contact with a sample support of a thermomechanical analysis instrument when thermomechanical analysis of sample 30 is performed. Sample carrier 1 further comprises shim 12. Shim 12 is dimensioned and intended to be received within carrier bowl 11. Shim 12 comprises an upward-facing contact face 122 of the sample carrier, which is essentially intended to place sample 30 thereupon. Shim 12 further comprises rim 121 provided on contact face 122. Rim 121 circumscribes a recessed area in which sample 30 is intended to be received. In the provided embodiment, rim 121 has an inner diameter at least essentially equaling the diameter of cylindrical sample 30. An end of sample 30 may thus be received within the area circumscribed by rim 121 and will be positionally secured therein as far as lateral displacements are concerned. Providing rim 121 on a separate shim rather than directly on sample carrier bowl 11 allows shim 12 to be replaced with a shim having a different rim diameter and thus allows sample carrier bowl 11 to be used with differently sized samples. Cover plate 20 of the shown sample carrier 1 also comprises a rim 201, cf. FIG. 2, provided on a face of cover plate 20 and circumscribing a recessed area intended for receiving the sample. Cover plate 20 further provides and includes in this non-limiting embodiment, the measuring probe contact section 212 which is intended to be brought into contact with a measuring probe of a thermomechanical analysis instrument when thermomechanical analysis of sample 30 is performed. The sample carrier 1 of FIG. 1*a* with sample 30 received therein is shown in FIG. 2 in a sectional view. FIG. 2 illustrates also the shortest distance 117*a* between the sections of the at least one lug which extends into two opposite directions and the greatest distances **117*b* between the same sections of the at least one lug: In the illustrated case, there are two lugs 115, 116 in the form of wings which extend into opposite directions. Therefore, every one of the wings 115, 116** forms a respective section of the at least one lug.

FIG. **1*b* shows a second exemplary embodiment of a sample carrier 1 of the herein described type. FIG. 1*b* shows the sample carrier 1 is a side view. It comprises a carrier bowl 11 and a cover plate 20 and has a sample 30 installed between the contact face of the sample carrier 1 and the cover plate 20. The sample carrier 1 of FIG. 1*b* differs from the one of FIG. 1*a* by the absence of the lugs 115 and 116. Instead, its side walls 113 and 114 comprise a clamping region 113*a* which is in this embodiment slightly recessed. A counterpart support element comprising a clamping mechanism can hold this sample carrier 1. In other embodiments, the side walls 113 and 114 do not comprise a particular clamping region 113*a* but are constructed sufficiently stiff to allow gripping and holding the sample carrier 1**.

Figure 4:
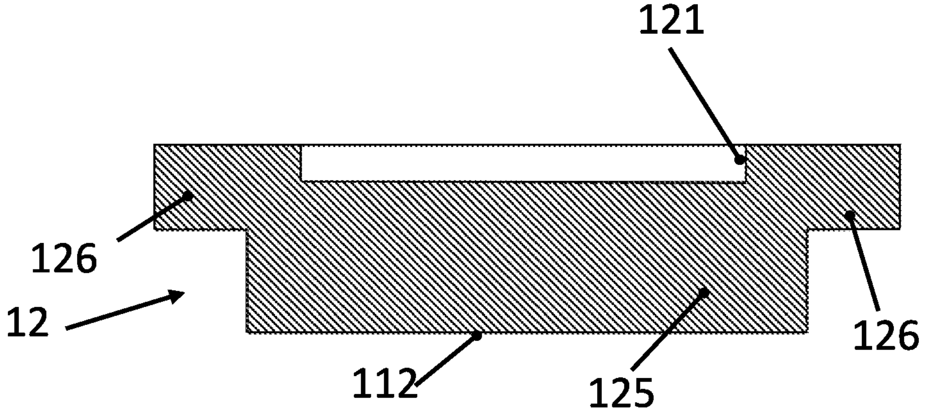
FIG. 4 an exemplary embodiment of a plug-shaped shim intended for used in connection of the frame of FIG. 3.

FIGS. 3 and 4 jointly outline a further embodiment of a sample carrier as herein disclosed. FIG. 3 shows a sample carrier frame 15. Sample carrier frame 15 comprises, analogously to the sample carrier bowl outlined in connection with FIGS. 1 and 2, a carrier frame bottom 151, side wall segments 152, 153, 154 and 155, and lugs or wings 156 and 157, which extend laterally from side wall segments in opposing directions of the sample carrier. An aperture 158 is provided through carrier frame bottom 151 of sample carrier frame 15 and is encircled by rim section 159 of carrier frame bottom 151. To form a sample carrier, sample carrier frame 15 is complemented by plug-shaped shim 12 shown in FIG. 4. Plug-shaped shim 12 comprises a peg section 125 and a circumferentially extending bearing section 126. Peg section 125 is intended to extend into or through aperture 158 of the carrier frame bottom 151, while bearing section 126 is intended to bear on rim section 159 of carrier frame bottom 151. Hence, when sample carrier frame 15 and plug-shaped shim 12 are assembled together as intended, they jointly form a sample carrier. A bottom face of plug-shaped shim 12 forms the support contact section 112, whereas a top face of plug-shaped shim 12 with a rim 121 serves as the contact face for receiving the sample. The bottom of this sample carrier is formed by the plug-shaped shim while the at least one side wall is formed by the side wall segments 152-155 of the sample carrier frame 15. It is important to note that in this embodiment sample carrier frame 15 may have no effect on the measurements, as the measurements are merely taken between the support contact section 112 and an upper end of the sample, or cover plate 20, respectively. Thus, the designer has a greater freedom of choice as to the applicable materials for sample carrier frame 15, and is free to choose cheaper and/or easier to machine materials than for plug-shaped shim 12.

Figure 5:
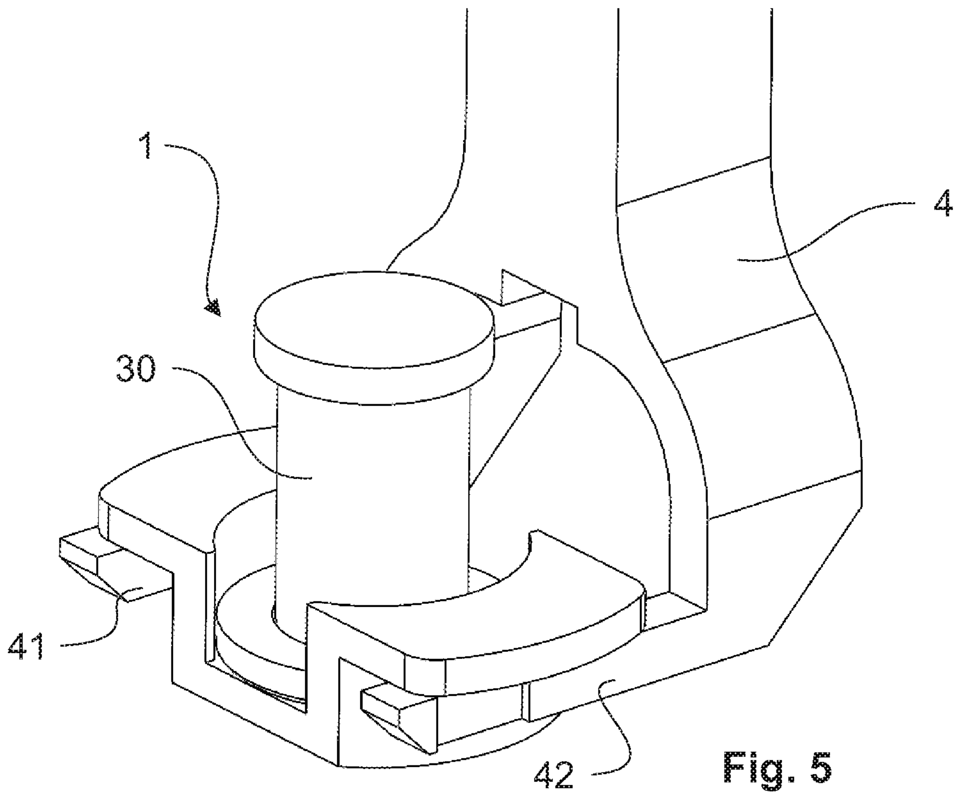
FIG. 5 a lifting fork for handling a herein described sample carrier.

FIG. 5 shows a tool 4 for handling a sample carrier, respectively. Reference sign 1 points to a sample carrier with a sample 30 installed essentially between the support contact section of the sample carrier and the measuring probe contact section of the cover plate. Tool 4 essentially is a lifting fork comprising two laterally spaced prongs 41 and 42. Prongs 41 and 42 are spaced from each other so as to receive a lower part of the sample carrier between them. It might be said that the free space between the two prongs is at least as large as the width or diameter of the bottom of the sample carrier. It might further be said that a free space between the two prongs is smaller than the total distance measured across the lugs. The width or diameter of the bottom of the sample carrier is preferably equal to the shortest distance **117*a* between the lug sections as illustrated in FIG. 2. The total distance measured across the lugs is preferably the greatest distance 117*b* between the same lug sections as shown in FIG. 2. Prongs 41 and 42 may be placed below the lugs and the lifting fork may be lifted such that prongs 41 and 42 make contact with a bottom face of each lug. The length of the prongs 41 and 42 is approximately the same as the lengths of the lugs of the sample carrier measured in the direction perpendicular to the direction in which the lugs extend laterally on opposing sides. The prongs 41 and 42 are connected by a U-shaped connection which rises perpendicular to the plane defined by the prongs 41, 42. Thereby, the U-shaped connection forms a limit stop to the sample carrier as the lugs contact the U-shaped connection when the prongs 41, 42** contact the lug sections in the desired way. The height of the U-shaped connection is preferably greater than the height of the highest samples for which the system is intended to be used. Thereby, the risk of collisions of the lifting fork with cover plates is minimized and the U-shaped connection can be used as a reference or cross-check when determining the height of the sample with a sample height detection unit.

Thus, lifting fork 4 may lift the sample carrier with the sample installed and move the sample carrier with the sample installed to another location. Likewise, the sample carrier with the sample installed may be placed inside and removed from a measurement cell of a thermomechanical analysis instrument by lifting fork 4. The lifting fork 4 is an example of a counterpart support element. The lifting fork 4 can be part of a manual tool with a handle attached to it so that the lifting and placing actions can be done by the user. In preferred embodiments, the lifting fork 4 is attached to a drive which moves the lifting fork 4 in the desired way to lift and handle the sample carrier. In another embodiment, the lifting fork 4 is part of a guiding system such a rail system or a handling arm which allows a user to move the fork 4 with the sample carrier along pre-defined paths of in pre-defined ranges by hand.

Figure 6:
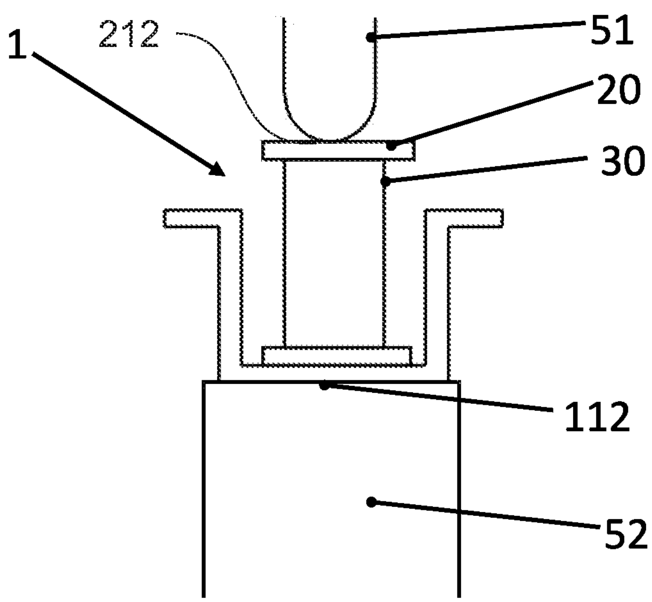
FIG. 6 a sample carrier as herein disclosed with a sample installed and received between a measuring probe and a sample support.

FIG. 6 shows a detail of a system for performing thermomechanical analysis. The sample carrier 1 with sample 30 installed is received between a measuring probe 51 and a sample support 52. It should be noted, and is familiar to the person skilled in the art, although not explicitly shown, that measuring probe 51 and sample support 52 are connected to a transducer generating a measurement output which is essentially dependent on the relative displacement and/or the force acting on the measuring probe 51 and sample support 52 relative to each other. The measuring probe 51 makes contact with the measuring probe contact section of the cover plate 20 which is placed on top of sample 30. Sample support 52 makes contact with support contact section 112 of the sample carrier. It is noted that, as outlined above, every component of the sample carrier along the way from support contact section 112 to the contact face (122) respectively to the measuring probe contact section 212, if there is a cover plate 20, may be made from materials which correspond to those of measuring probe 51 and sample support 52, or materials having a coefficient of thermal expansion not excessively deviating from the coefficient of thermal expansion of the material from which measuring probe 51 and sample support 52 are made. Measuring probe 51 and sample support 52 are usually made from fused silica or ceramic or quartz. Fused silica and quartz inhibit coefficients of thermal expansion of less than $1.10^{-6}$, which is at least one order of magnitude lower than that of most other materials. Preferably, the user choses the sample support 52 and measuring probe 51 based on the highest temperature intended to occur during the measurement process: If it is lower than 1100° C. quartz and fused silica are preferred, if it is higher than 1100° C., ceramics such as Alox and sapphire are preferred materials. Also, cover plate 20 may be made from a material which corresponds to those of measuring probe 51 and sample support 52, or a material having a coefficient of thermal expansion not excessively deviating from the coefficient of thermal expansion of the material from which measuring probe 51 and sample support 52 are made. Thus, as will be appreciated, if the sample carrier with sample 30 installed therein together with measuring probe 51 and sample support 52 is heated, or chilled, in a measurement cell, the transducer to which measuring probe 51 and sample support 52 are connected will sense a relative displacement and/or the force causing this displacement between measuring probe 51 and sample support 52 which equals the thermal expansion, or contraction, respectively, of the sample along the connection line between the measuring probe 51 and the sample support 52. However, if cover 20 and support contact section 112 of the sample carrier are made from a material different than that of measuring probe 51 and sample support 52, the measurement may be numerically corrected for the thus resulting additional expansion or contraction.

It is noted that thermomechanical analysis may comprise other measurement modes than one related to termination of the coefficient of thermal expansion of a sample. In all these measurement modes, however, the analysis will take advantage of the above-described benefits of the sample carrier, in particular the advantage of being able to more easily place the sample into a measurement cell and remove it from there.

Figures 7A, 7B, 8, 9:
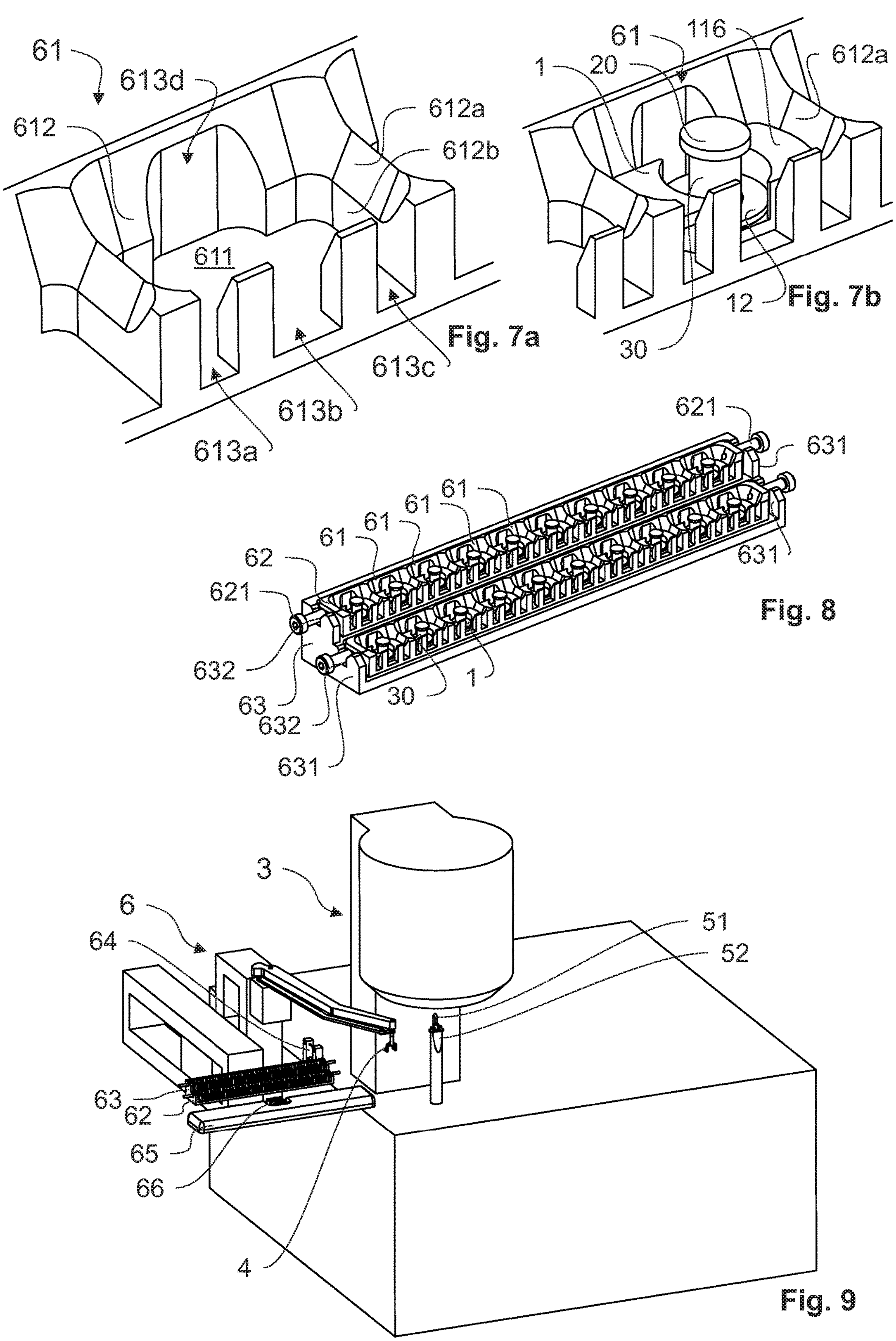
FIG. 7*a,b* A sample storage.
FIG. 8 Two sample storage rails on a sample storage shelf.
FIG. 9 A system for performing thermomechanical analysis comprising a sample handling system.

FIGS. 7*a* and *b* illustrates a sample storage 61 which can be used in a sample handling system 6 according to the invention and which is suitable to hold any one of the sample carriers 1 illustrated in the proceeding figures. The sample storage 61 comprises a storage bottom 611 and a storage side wall 612. The storage bottom 611 has in the depicted example an essentially rectangular shape and it is flat. The storage side wall 612 is perpendicular to the storage bottom 611. It comprises three vertical gaps 613 *a,b,c* and—opposite of one of the vertical gaps 613*b*—, a thinned section 613*d*. The storage side wall 612 is chamfered in an upper section 612*a* and upright in a lower section 612*b*. As can be more clearly seen in FIG. 7*b*, the sample storage 61 is adapted to the sample carrier 1 to be arranged in it. FIG. 7*b* shows the sample storage 61 with a sample carrier 1 comprising two wings 116 inside it: The dimensions and the chamfer of storage side wall 612 is such that when the sample carrier 1 is placed on the storage bottom 611, the position of the wings 116 formed by the lugs is defined by the storage side wall 612. Thereby, the position of the sample carrier 1 is defined relative to the sample storage 61. The front side of the sample storage 61 is defined by the vertical gaps adapted to the counterpart support element. In the shown embodiment, there are two gaps 613*a, c* which allow prongs of a lifting fork, which is one embodiment of a counterpart support element, to move in—and out of the sample storage. As clearly visible in FIG. 7*b*, the vertical gaps 613 *a* and *c* are positioned such that they create an opening to a volume below the wings 116 of the sample carrier 1. There is a central vertical gap 613 *b* arranged between the vertical gaps 613*a* and *c*, which is opposite of the thinned section 613 *d*. Both, the thinned section 613 *d* and the central vertical gap 613 *b*, are aligned with spaces between the side wall sections of the sample carrier 1. The central vertical gap 613*b* and the thinned section of the storage side wall 612 increase the space available to the user for placing or removing a sample 30 into or from the sample carrier 1. Providing such a central vertical gap 613*b* and a thinned section of the storage side wall 612 therefore allows the user to conveniently place the sample 30 in the sample carrier arranged in the sample storage 61. As can be seen, the two vertical gaps 613*a* and *c* allow the prongs of the lifting fork to move in- and out of the sample storage 61 with a first and a second motion, whereby the first motion is perpendicular to the plane defined by the storage bottom and whereby the second motion is parallel to the plane defined by the storage bottom and perpendicular to the front side.

FIG. 8 illustrates two sample storage rails 62 on a sample storage shelf 63. Each one of the sample storage rails 62 comprises a plurality of sample storages 61 and a handle 621 on each end. The sample storages 61 are arranged side by side such that the second motions defined for each of them are parallel to each other and such that all storage bottoms 611 are in the same plane. The storage shelf 63 comprises two levels. Each level is delimited by a shelf side wall 631 on both ends. The shelf side walls 631 comprise each a gap 632 in which a part of the handle 621 is placed. In the shown embodiment, both levels comprise in addition a back wall. Thereby a sample storage rail 62 positioned on a level of the sample storage shelf 63 is surrounded on four sides by the sample storage shelf 63. A motion to the front side, as defined by the sample storages 61, is hindered by the handles 621 being arranged in the gaps 632 in the shelf side walls 631. Therefore, the only way to remove a sample storage rail 62 from the sample storage shelf 63 is by lifting it upwards.

FIG. 9 shows the system for performing thermomechanical analysis 3 comprising a sample handling system 6. The system for performing the thermomechanical analysis 3 comprises a sample support and a measuring probe. A sample arranged in a sample carrier is shown to be arranged on the sample support and below the measuring probe. A furnace to heat and cool the sample during the measurement is arranged in the hood above the sample support. This hood will be lowered for the measurement whereby the sample, sample carrier, sample support and measuring probe will be inside the furnace. Mounted to the body of this measurement system is the sample handling system 6. The sample handling system 6 comprises in the shown embodiment a sample storage shelf 63 comprising two sample storage rails 62. Each sample storage rail 62 comprises ten sample storages 61. A sample carrier 1 comprising a sample 30 is arranged in every one of the sample storages 61. The sample storage shelf 63 is mounted to a first base of the sample handling system 6. There is further a hand rest 65 mounted to the first base of the sample handling system 6 which facilitates the placement of the samples 30 in the sample storages 61 for the user. In the shown embodiment a sample preparation position 66 is arranged in front of the sample storage shelf 63 and in proximity to the hand rest 65. This increases the comfort and facilitates arranging a sample 30 in the sample carrier 1. Finally, a light gate 64 which is used as a sample height detection unit is mounted the body of the measurement system. The first base can be moved in a second horizontal direction with respect to a fixed part attached to the body of the measurement system, whereby the second horizontal direction is parallel to the direction of the second motion of the sample storages. A lifting fork 4 is mounted to a second base which comprises an axis around which an arm with the lifting fork 4 mounted to it can turn. The lifting fork 4 itself can turn around a second axis arranged at the end of the arm. This allows to control the orientation of the prongs of the lifting fork 4. The drive can be controlled by a control of the system for performing the thermomechanical analysis. The drive can cause the first base to move in the second horizontal direction. The drive can further cause the second base to move in the vertical direction. Finally, the drive can cause the arm and the lifting fork 4 to rotate around the respective axis which results in the ability to displace the sample carriers in a first horizontal direction. Therefore, the system for performing thermomechanical analysis 3 allows an automized handling of the sample carriers 1 comprising the samples 30 between the sample storage shelf 63 and the sample support 52 at the measurement location. The sample high detection unit 64 allows to optimise the measurement process and the opening and lowering of the measuring probe 51. An integrated hand rest 65, including the sample preparation position 66, allows the user to prepare the samples comfortably directly at sample handling system. Handles on the sample storage rails 62 allow a preparation at a remote place, too.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

REFERENCE SIGNS LIST

1 Sample carrier
3 System for performing thermomechanical analysis
4 Lifting fork
6 Sample handling system
11 Sample carrier bowl
12 Shim
15 Carrier frame
20 Cover plate
30 Sample
41,42 Prong of lifting fork
51 Measuring probe
52 sample support
111 Bottom of sample carrier
112 support contact section
113,114 Side wall of sample carrier; side wall segment
115,116 Lug, wing
117*a*,*b* shortest/longest distance between the lug sections
121 Rim
122 Contact face
125 Peg section of shim
126 Top bearing section of shim
151 carrier frame bottom
152-155 Side wall of sample carrier; side wall segment
156,157 Lug, wing
158 Bottom aperture
159 Rim section of the bottom of the sample carrier
201 Circumferential rim of cover plate
212 measuring probe contact section
61 Sample storage
611 storage bottom
612 storage side wall
612*a* chamfered upper section
612*b* upright lower section
613 vertical gaps
614 distance and the chamfer of the side wall
62 Sample storage rail
621 Handle
63 Sample storage shelf
631 shelf side walls
632 a gap suitable to receive at least a part of the handle
64 Light gate
65 Hand rest
66 Sample preparation position

The invention claimed is:

1. A system for performing thermomechanical analysis of a sample, the system comprising:
a thermomechanical analysis instrument; and
a sample carrier comprising:
a bottom;
at least one side wall extending upward relative to the bottom;
a contact face for receiving a sample, the contact face facing upward, wherein a circumferential rim is provided on the contact face for receiving the sample within an area circumscribed by the rim and for defining the position of the sample relative to the bottom; and
a shim, the shim comprising the circumferential rim;
wherein the thermomechanical analysis instrument comprises a measuring probe and a sample support with a measuring probe tip pointing towards the sample support;
wherein the sample carrier is configured to be arranged between the sample support and the measuring probe during a measurement.

2. The system of claim 1, wherein:
the at least one side wall of the sample carrier comprises at least two separate side wall segments.

3. The system of claim 2 further comprising:
at least one lug laterally cantilevered from a subset of the at least two side wall segments on each of two opposed sides of the sample carrier;
a counterpart support element, which is arranged and configured to receive the at least one lug of the sample carrier.

4. A system of claim 3 wherein:
the counterpart support element comprises a lifting fork for lifting and transportation of the sample carrier, said lifting fork comprising a pair of prongs laterally offset from each other, where the lateral distance between the prongs of the pair of prongs is greater than a shortest distance between lug sections and smaller than a greatest distance between the lug sections.

5. The system of claim 1, wherein:
the sample carrier further comprises a carrier frame;
the carrier frame comprises the at least one side wall; and
the shim or a bottom plate extends through, or at least partially defines, the bottom, and provides a support contact section.

6. The system of claim 5, wherein:
the carrier frame consists of a material different from the shim or the bottom plate.

7. The system of claim 1 wherein:
the sample carrier further comprises a cover plate;
the cover plate comprises a circumferential rim provided on a face of the cover plate and circumscribing an area;
the area circumscribed by the rim of the cover plate is congruent with the area circumscribed by the rim provided on the contact face of the sample carrier; and
the cover plate provides a measuring probe contact section.

8. The system of claim 1 wherein:

all materials of the sample carrier which are arranged between a support contact section and the contact face are the same or do not deviate by more than 10% in their coefficient of thermal expansion.

9. The system of claim 1 further comprising:

a sample handling system comprising a counterpart support element and a sample storage, wherein a position and a size of at least one vertical gap on a front side of the sample storage is adapted to the counterpart support element such that the counterpart support element is able to access and support the sample carrier located inside the sample storage to remove the sample carrier from the sample storage or to place the sample carrier inside the sample storage.

10. A system of claim 9, wherein:

the sample storage comprises a storage bottom and a storage side wall at least partially surrounding the storage bottom, whereby the storage side wall:

is chamfered in an upper section;

is interrupted at least on a front side such that at least one vertical gap is provided;

wherein a distance and a chamfer of the side wall is such that the sample carrier is guided to a defined position inside the sample storage when it is placed on the bottom of the sample storage.

11. A system of claim 9, further comprising:

a sample storage rail comprising:

a plurality of the sample storage arranged side by side such that all storage bottoms are arranged in a single plane.

12. The system of claim 11 further comprising:

a sample storage shelf comprising one or more platforms arranged in levels, wherein each platform is sized and shaped to receive the sample storage rail.

13. The system of claim 1 wherein:

the bottom of the sample carrier is configured to be supported by the sample support while the measuring probe tip contacts either the sample or the cover plate located on top of the sample when the sample is arranged in the sample carrier during a measurement.

14. The system of claim 1, wherein:

at least a support contact section of the sample carrier consists of a same material as the measuring probe and the sample support, or of a material having a coefficient of thermal expansion not deviating by more than 10% from that of the material of the measuring probe and the sample support.

15. The system of claim 1, further comprising:

a drive functionally coupled with a counterpart support element, wherein the drive is configured to move the counterpart support element to grasp the sample carrier, wherein the drive is further configured to move the sample carrier into a measurement location between the measuring probe and the sample support and to place the sample carrier on the sample support in a measurement cell.

16. The system of claim 15 further comprising:

a sample height detection unit and the drive is configured to move the sample carrier comprising the sample though said sample height detection unit whereby the sample height is measured and whereby a control unit of the thermomechanical analysis instrument adapts the position of the measuring probe and/or the sample support in reaction to the detected sample height.

* * * * *